United States Patent [19]
Lee

[11] Patent Number: 5,434,833
[45] Date of Patent: Jul. 18, 1995

[54] APPARATUS FOR AUTOMATICALLY EJECTING MAGAZINE IN COMPACT DISC PLAYER

[75] Inventor: Chan H. Lee, Kyungki, Rep. of Korea

[73] Assignee: Samsung Electronics Co., Ltd., Kyungki, Rep. of Korea

[21] Appl. No.: 85,874

[22] Filed: Jul. 6, 1993

[30] Foreign Application Priority Data

Jul. 4, 1992 [KR] Rep. of Korea .................. 92-11956

[51] Int. Cl.⁶ .............................................. G11B 17/22
[52] U.S. Cl. ...................................... 369/36; 369/77.2
[58] Field of Search ............... 369/36, 34, 192, 193, 369/194, 77.2, 178; 360/99.02, 99.03, 99.06, 99.07

[56] References Cited
U.S. PATENT DOCUMENTS 4,670,802  6/1987  Ogawa et al. ............. 369/77.2
4,701,900  10/1987  Hasegawa et al. ............. 369/36
5,077,717  12/1991  Onishi et al. ............. 369/34
5,260,922  11/1993  Chigasaki ............. 369/36
5,265,078  11/1993  Akiyama et al. ............. 369/36

Primary Examiner—Robert S. Tupper
Assistant Examiner—William R. Korzuch
Attorney, Agent, or Firm—Sughrue, Mion, Zinn, Macpeak & Seas

[57] ABSTRACT

In an apparatus for automatically ejecting the magazine in a compact disc player, a magazine loading a plurality of compact discs can be quickly ejected regardless of where the magazine is located during the play operation. The compact disc player includes a magazine installation portion X and a disc playing portion Y. A driver A is installed on a deck 1 and under the magazine installation portion X in which a magazine housing 2 accommodating a magazine 15 is installed. Further, a straight moving lever B which is straightly moved by the driver A is installed on the deck 1. Further, a locking and releasing lever C pivoted by the straight moving lever B is installed under the magazine housing 2.

13 Claims, 9 Drawing Sheets

APPARATUS FOR AUTOMATICALLY EJECTING MAGAZINE IN COMPACT DISC PLAYER

FIELD OF THE INVENTION

The present invention relates to an apparatus for automatically ejecting the magazine in a compact disc player, in which the magazine loading a plurality of compact discs can be automatically ejected at any position.

BACKGROUND OF THE INVENTION

In conventional movable disc players for automobiles, a magazine can be ejected only when the magazine is placed at a particular position. Meanwhile, when the magazine loading a plurality of compact discs moves up and down, the player can be played, and if an ejecting button is pushed during the play operation, the magazine is ejected after it is restored to the position in which it can be completely ejected. This results in a disadvantage that the ejection of the magazine is delayed.

SUMMARY OF THE INVENTION

The present invention is intended to overcome the above disadvantage according to the conventional technique.

An object of the present invention is to provide an apparatus for automatically ejecting a magazine in a compact disc player, in which the magazine loading a plurality of disc players can be automatically ejected at any position, thereby facilitating convenience in using the compact disc player and preventing delays during ejecting the magazine.

In achieving the above object, the compact disc player having a magazine installation portion and a disc playing portion according to the present invention includes: a driver installed on a deck and under the magazine installation portion, the magazine installation portion being for installing a magazine housing, and the housing being for receiving the magazine; a straight moving lever for being moved straightly by the driver; a locking and releasing lever coupled the driver; a locking and releasing lever installed under the magazine housing, and coupled to the straight moving lever; and a magazine locking and releasing lever and an ejecting lever which is actuated by the locking and releasing lever.

BRIEF DESCRIPTION OF THE DRAWINGS

The above object and other advantages of the present invention will become more apparent by describing in detail the preferred embodiment of the present invention with reference to the attached drawings in which:

FIGS. 5 and 6 illustrate the actuation of an automatic magazine ejecting apparatus of a compact disc player according to the present invention, in which FIG. 7 is a sectional view of the critical portions of the apparatus of the present invention, in which

DESCRIPTION OF THE PREFERRED EMBODIMENT

Figure 1:
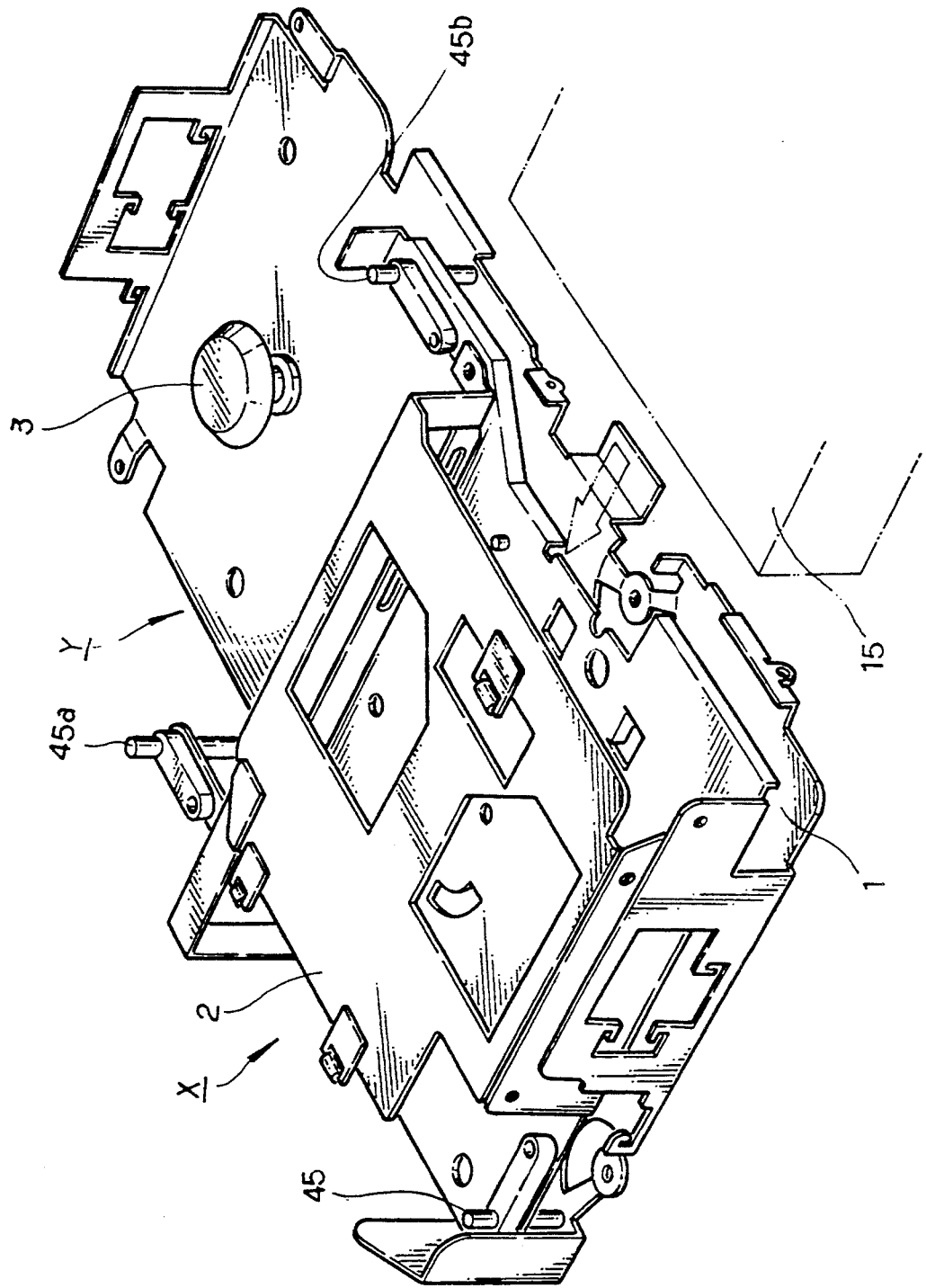
FIG. 1 is a perspective view of an apparatus according to the present invention.
Figure 2:
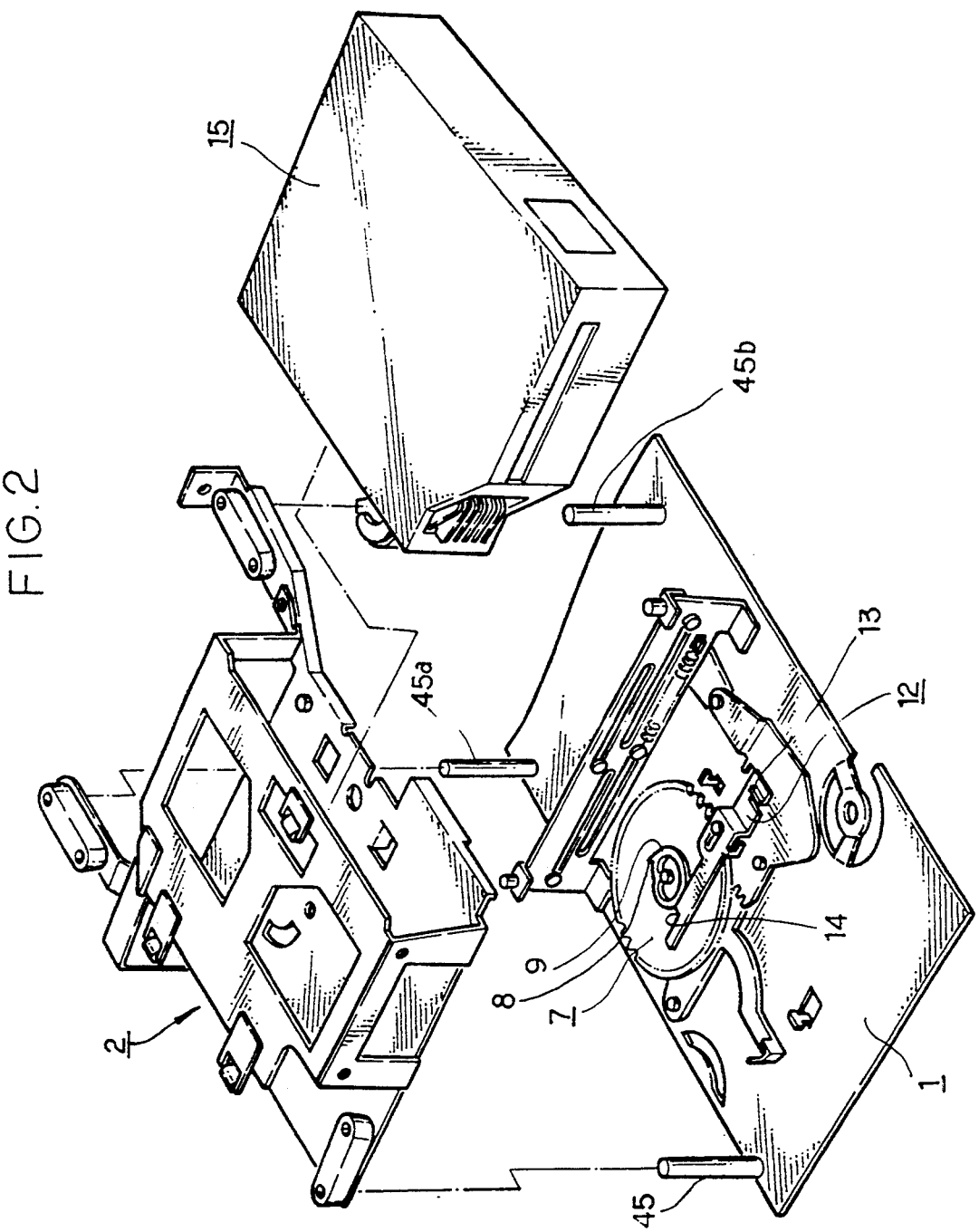
FIG. 2 illustrates a state with a deck and a magazine housing separated from each other according to the present invention.
Figure 3:
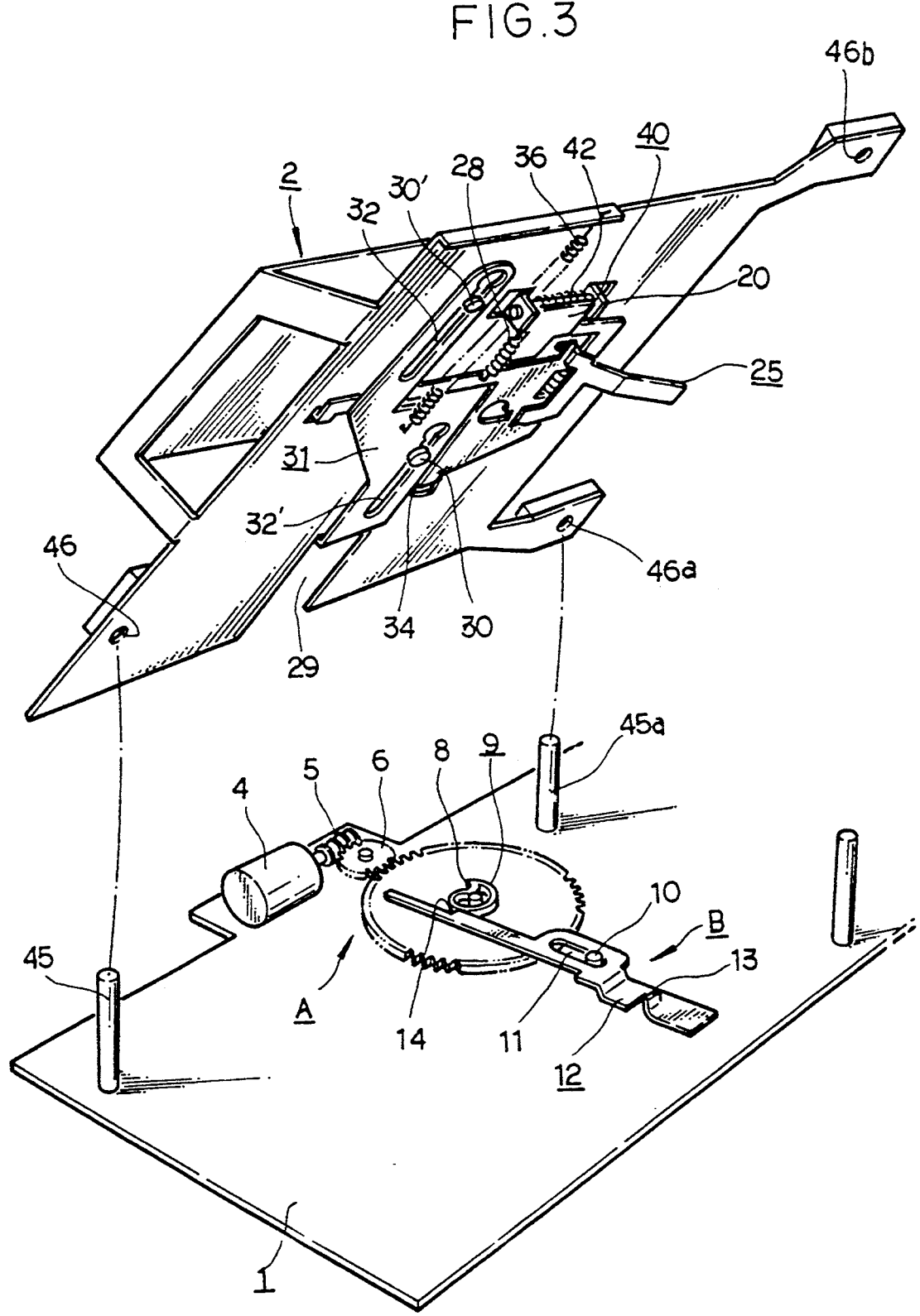
FIG. 3 is a perspective view showing a rear side of the magazine housing according to the present invention.
Figure 4:
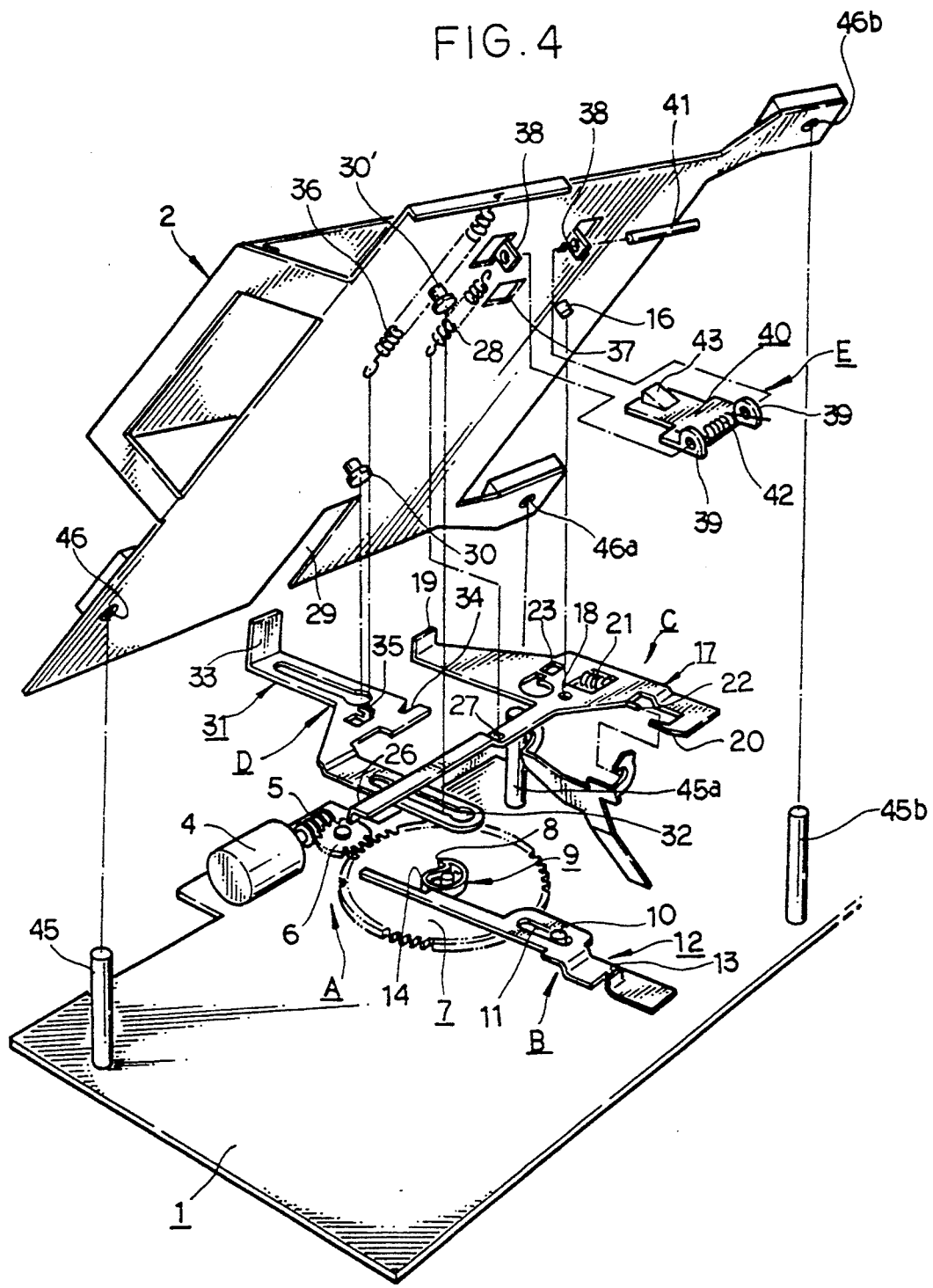
FIG. 4 is an exploded perspective view of an apparatus according to the present invention.

FIG. 1 is a perspective view showing an external shape of an apparatus of the present invention, FIG. 2 is a perspective view of a deck and a magazine housing separated from each other according to the present invention, FIG. 3 is a perspective view showing a rear side of the magazine housing according to the present invention, and FIG. 4 is an exploded perspective view of the apparatus according to the present invention.

As shown in FIG. 1, the apparatus of the present invention includes: a magazine installation portion X with a magazine housing 2 installed on a deck 1 of a compact disc player; and a disc playing portion Y with a turn table 3 installed thereon for placing a compact disc to play it. As shown in FIGS. 4, on the magazine installation portion X of the deck 1, there are installed a driver A and a straight moving lever B which is actuated by the driver A.

The driver A is constituted as follows.

A drive motor 4 is fixedly installed at the rear of the deck 1, and a worm 5 is installed coaxially with the drive motor 4. A gear 6 is engaged with the worm 5, and a cam gear 7 is engaged with the gear 6, while a cam 9 having a push portion 8 is mounted on the cam gear 7.

Now the straight moving lever B will be described as to its constitution.

A guide pin 10 is projected up at a side of the cam gear 7, and a straight moving lever 12 having a guide slot 11 is guided by the guide pin 10. On the front portion of the lever 12, there is provided a push piece 13, while, on the rear portion of the lever 12, there is formed an engaging piece 14. Thus, the engaging piece 14 is made to be pushed by the push portion 8 of the cam 9.

As shown in FIG. 4, under the magazine housing 2, there is installed a locking and releasing lever C which is pivoted by the straight moving lever B. Further, there is installed an ejecting lever D for being locked and released by the locking and releasing lever C to eject a magazine 15. Further, there is installed a magazine locking and releasing lever E which locks the magazine 15 loaded in the magazine housing 2, and which is actuated by the locking and releasing lever C.

Now, the locking and releasing lever C will be described as to its constitution.

A rotation pin 16 is fixedly installed on the bottom of the magazine housing 2, and a main lever 17 is pivotally installed to the pin 16. Further, an installation hole 18 is formed on the main lever 17, and the pin 16 is rotatably coupled with the installation hole 18.

A locking piece 19 is formed on one end of the main lever 17, while an abutting piece 20 is formed on the other end of the main lever 17 in an inclined form. At an intermediate position of the main lever 17, there is installed a resilient spring 21, while, at the opposite sides of the spring, there are formed a hinge pin 22 and a hinge hole 23. Further, a sub-lever 25 is pivotally and elastically installed onto the hinge pin 22 and the hinge hole 23 (see FIG. 3). Further, a switch touching portion 26 extends from a side of the main lever 17, and a spring securing hole 27 is formed at an intermediate position of the extended switch touching portion 26, while a first tension spring 28 is installed on the spring securing hole 27.

Now, the ejecting lever D which is locked and released by the locking and releasing lever C and which ejects the magazine 15 will be described as to its constitution.

An elongate guide slot 29 and a pair of guide pins 30 and 30' are installed on the bottom of the magazine housing 2, while guide slots 32 and 32' are formed on an ejecting lever 31 so as for the guide slots 32 and 32' to be guided by the guide pins 30 and 30' (see FIG. 3). Further, on the rear end of the ejecting lever 31, there is formed a magazine push piece 33, so that the magazine push piece 33 should be guided by the guide slot 29.

At an intermediate position of the ejecting lever 31, there is formed a lock slot 34 so as for it to receive the locking piece 19, while a spring securing piece 35 is formed, so that one end of a second tension spring 36 can be elastically connected to the front end of the magazine housing 2.

Now, the magazine locking and releasing lever E which locks the magazine 15 of the magazine housing 2 and which is actuated by the locking and releasing lever C will be described below as to its constitution.

Figure 7A:
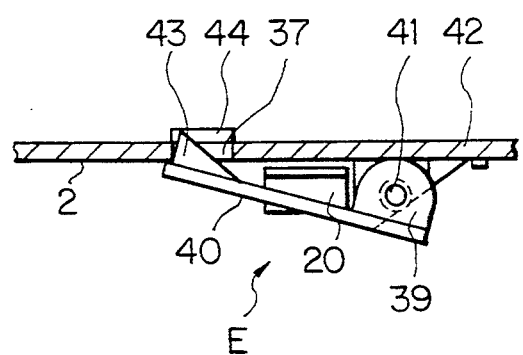
FIG. 7A illustrates a state with the magazine locked.

A rectangular hole 37 and a pair of hinge ribs 38 are formed on the bottom of the magazine housing 2, and a magazine locking and releasing lever 40 having a pair of hinge pieces 39 is rotatably coupled with the hinge ribs 38 by means of a hinge shaft 41, while a torsion spring 42 is installed on the hinge shaft 41. Further, an engaging piece 43 is formed on one end of the lever 40, and this engaging piece 43 is inserted through the rectangular hole 37 to be coupled with a lock slot 44 which is formed on the bottom of the magazine 15 as shown in FIG. 7.

Meanwhile, on the corners of the deck 1, there are uprightly installed guide shafts 45, 45a and 45b, while, on the corners of the magazine housing 2, there are formed insertion holes 46, 46a and 46b so as for the guide shafts 45, 45a and 45b to be inserted into the insertion holes 46, 46a and 46b. Meanwhile, in FIGS. 5B and 6B, reference code 47 indicates a switch.

The operation of the apparatus of the present invention constituted as above will now be described.

The operation and effect will be described referring to FIGS. 5A, 5B, 6A and 6B, while the systematic descriptions will be made referring to FIGS. 1 to 4.

Figure 5A:
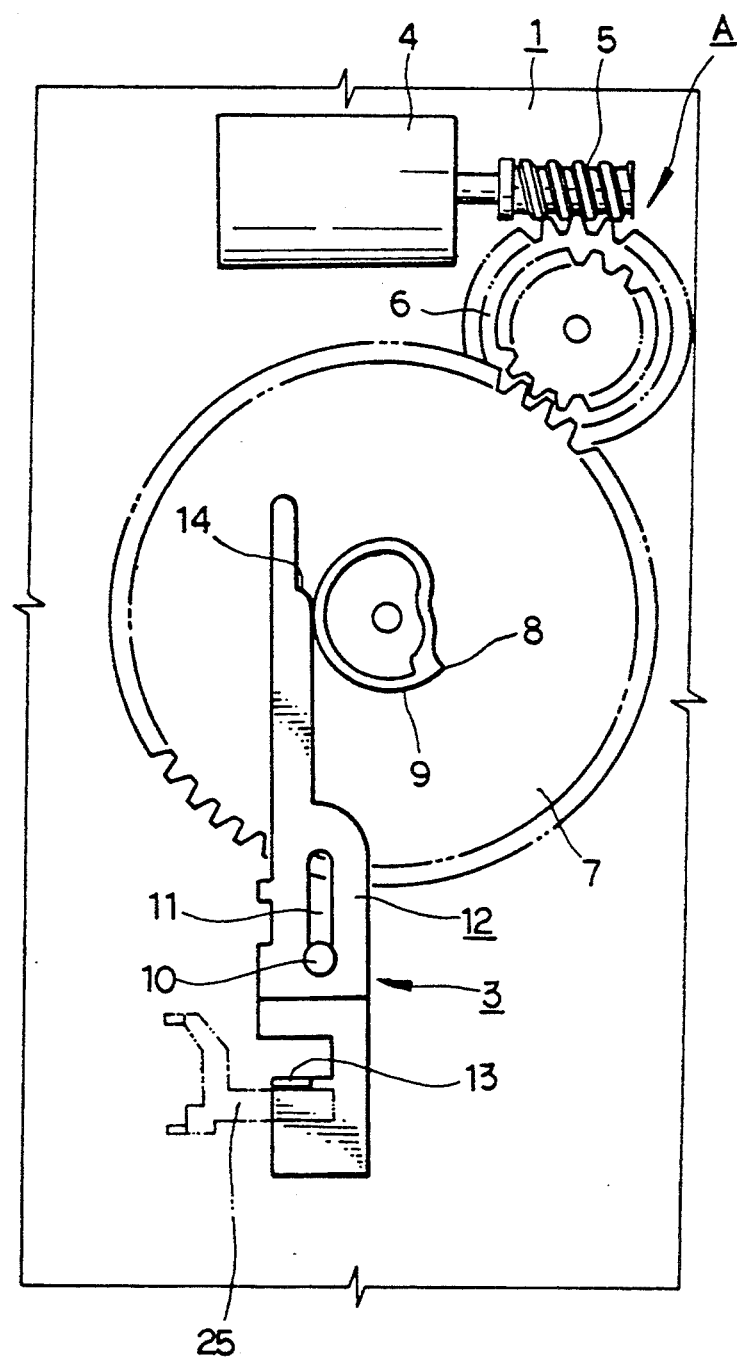
FIGS. 5A and 6A are plan views of a straight moving lever and a driver installed on the deck.
Figure 5B:
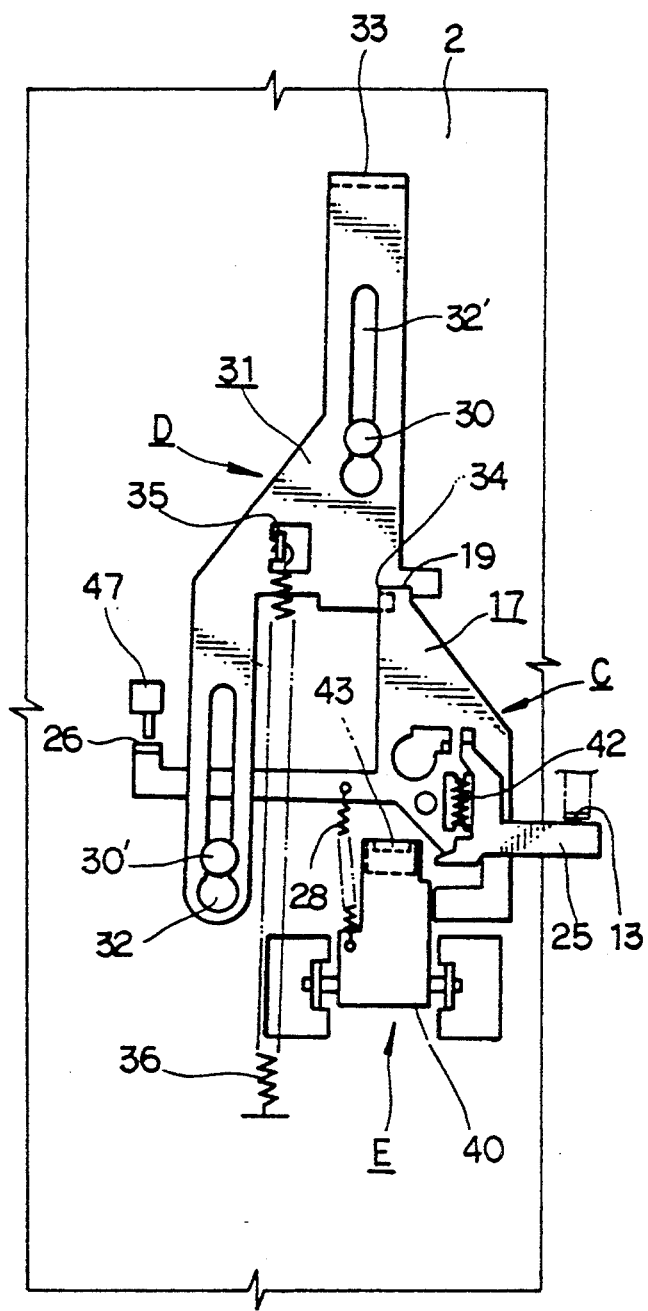
FIGS. 5B and 6B are upside-down views of the magazine housing with a locking and releasing lever, an ejecting lever and a magazine locking and releasing lever installed thereon.
Figure 6A:
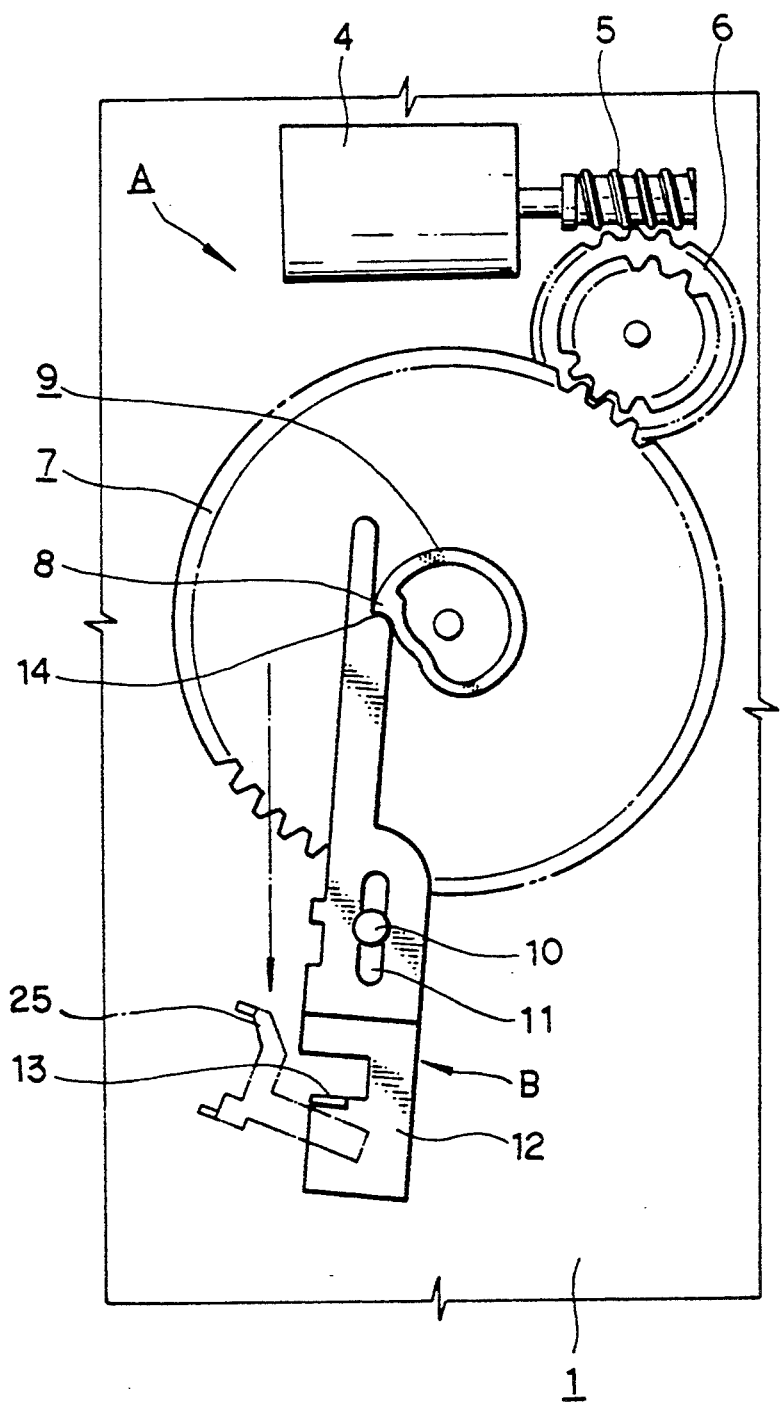
Figure 6B:
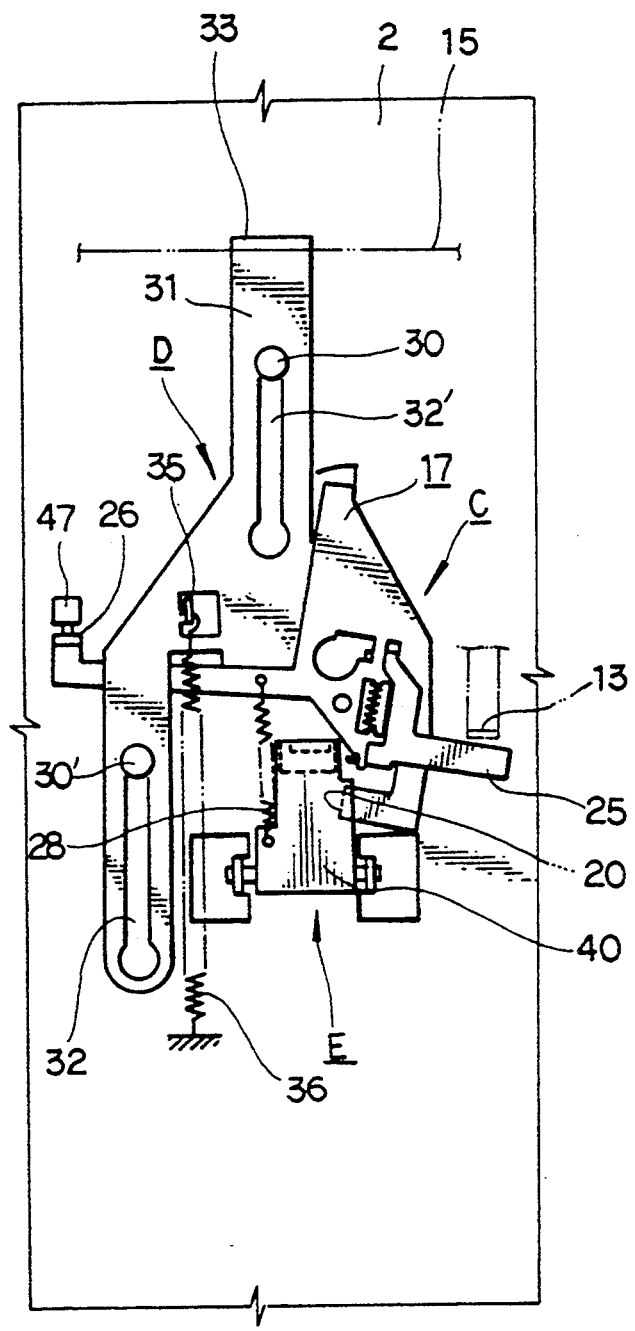

FIGS. 5A and 6A are plan views of the driver A and the straight moving lever B which are installed on the deck 1. FIGS. 5B and 6B are upside-down views of the magazine housing 2 on which the locking and releasing lever C, the ejecting lever D and the magazine locking and releasing lever E are installed. These components are positioned above the deck 1.

At least, one or more compact discs are loaded in the magazine 15, and the magazine housing 2 moves up and down actuated by conventionally used means along the guide shafts 45, 45a and 45b. Thus, a compact disc can be moved to the disc playing portion Y by actuation of conventionally used means, and thus, the player can be played. During the play operation, to eject the magazine by the user, the drive motor 4 is activated by pushing an ejecting button (not shown).

When the drive motor 4 is activated, the worm 5 is rotated, and when the worm is rotated, the gear 6 and the cam gear 7 are rotated at the same time as shown in FIG. 5A.

When the cam gear 7 is rotated, the cam 9 is rotated together, so that the push portion 8 should push the engaging piece 14 of the straight moving lever 12 as shown in FIG. 6A. Under this condition, the straight moving lever 12 is guided by the guide pin 10 as shown in FIG. 6A.

When the straight moving lever 12 moves as shown in FIG. 6A, the sub-lever 25 is pushed as shown in FIG. 6B, under the condition of FIG. 5B in which the push pin 13 is illustrated. Under this condition, the first tension spring 28 exerts its tensional force, so that the locking and releasing lever 17 of the locking and releasing lever C should be pivoted around the rotation pin 16.

Then, the abutting piece 20 of the main lever 17 pushes out the magazine locking and releasing lever 40 assisted by the torsion spring 42.

Figure 7B:
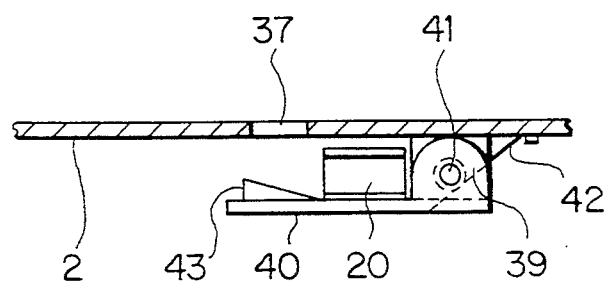
FIG. 7B illustrates a state with the magazine released.

Then, the engaging piece 43 is released from the magazine lock slot 44 to come out from the rectangular hole 37 as shown in FIG. 7B. At the same time, the locking piece 19 of the main lever 17 comes out from the lock slot 34 of the ejecting lever 31. When the locking piece 19 comes out from the lock slot 34, the guide slots 32 and 32' are guided by the guide pins 30 and 30', while the magazine push piece 33 gripping the magazine 15 is guided along the guide slot 29 as shown in FIG. 6B to be ultimately ejected out.

As described above, the magazine 15 is ejected by the locking and releasing lever C, the magazine locking and releasing lever E and the ejecting lever D. Meanwhile, if the locking and releasing lever C is rotated to release the ejecting lever D, and if the switch touching portion 26 pushes the switch 47 as shown in FIG. 6B, then the drive motor 4 stops.

Now, the reloading the magazine 15 into the magazine housing 2 will be described. If the magazine 15 is inserted into the magazine housing 2, the rear corner portion of the magazine 15 pushes against the magazine push piece 33 of the ejecting lever D to reversely guide the ejecting lever 31. Under this condition, the locking piece 19 of the main lever 17 which has been supporting the first tension spring 28 is re-inserted into the lock slot 34, thereby bringing a locked state.

Further, the abutting piece 20 is restored to be released from the magazine locking and releasing lever 40, and therefore, the engaging piece 43 passes through the rectangular hole 37 to be inserted into the lock slot 44 of the magazine 15 by the acted force of the torsion spring
thereby resulting in a locked state.

Thus, the magazine 15 is loaded into the magazine housing 2. Further, the sub-lever 25 is elastically pressed down all the time by the resilient spring 21 of the main lever 17, and therefore, even if the magazine housing 2 moves up and down, it is engaged with the push pin 13 all the time. Thus, whenever it is to eject the magazine during the play operation with moving up and down the magazine housing 2 loading the magazine 15, it can be easily ejected regardless of where the magazine is located.

And therefore, the loss of time which was unavoidable in the conventional compact disc player can be prevented, thereby providing the convenience of quickly changing the compact discs during play operation.

What is claimed is:

1. An apparatus for automatically ejecting a magazine in a compact disc player including magazine installation means and disc playing means, said magazine housing at least one compact disc, said apparatus comprising:
- a driver installed on a deck and located below said magazine installation means, said magazine installation means being adapted for accommodating a magazine housing, and said magazine housing being adapted for receiving a magazine;
- a straight moving lever for being moved by said driver;
- a locking and releasing lever positioned under said magazine housing, said locking and releasing lever being pivoted by said straight moving lever, said locking and releasing lever being pivotally mounted about a rotation pin formed on the bottom of said magazine housing, and comprises a main lever which is pivotally installed on said rotation pin and a sub-lever elastically installed on said main lever for pivoting said locking and releasing lever by said straight moving lever;
- an ejecting lever coupled to the magazine for ejecting the magazine, said ejecting lever being engaged by a locking piece of the main lever of the locking and releasing lever;
- a magazine locking and releasing lever actuated by an abutting piece on the main lever of said locking and releasing lever.

2. The apparatus for automatically ejecting the magazine in a compact disc player as claimed in claim 1, wherein said driver comprises a drive motor having a worm gear installed on said deck, and a gear coupled to a cam gear and said worm gear.

3. The apparatus for automatically ejecting the magazine in a compact disc player as claimed in claim 2, wherein a can having a push portion is coaxially mounted on said can gear.

4. The apparatus for automatically ejecting the magazine in a compact disc player as claimed in claim 1, wherein a guide pin projects from said deck, and said straight moving lever has a guide slot in which said guide pin is received.

5. The apparatus for automatically ejecting the magazine in a compact disc player as claimed in claim 3, wherein said straight moving lever has a push piece formed on the front portion thereof, and an engaging piece is provided on the rear portion thereof so that the engaging piece can be pushed by said push portion of said cam.

6. The apparatus for automatically ejecting the magazine in a compact disc player as claimed in claim 1, wherein said main lever is constituted such that an inclined abutting piece is formed on one end thereof, a lock piece is formed on the other end thereof, a switch touching means extends from a side thereof, and a resilient spring and a hinge hole with a hinge pin are formed on the intermediate portion thereof.

7. The apparatus for automatically ejecting the magazine in a compact disk player as claimed in claim 6, wherein said main lever is provided with a spring securing hole, and a first tension spring connects said main lever to said magazine locking and releasing lever.

8. The apparatus for automatically ejecting the magazine in a compact disc player as claimed in claim 1, wherein said sub-lever is provided with hinges on the opposite ends thereof.

9. The apparatus for automatically ejecting the magazine in a compact disc player as claimed in claim 1, wherein said main lever is provided with a spring securing hole, and a first tension spring connects said main lever to said magazine locking and releasing lever.

10. The apparatus for automatically ejecting the magazine in a compact disc player as claimed in claim 1, wherein
- a rectangular hole and a pair of hinge ribs are formed on the bottom of said magazine housing;
- hinge pieces are formed on the opposite sides of said magazine locking and releasing lever;
- a hinge shaft is provided between the hinge ribs on which the magazine locking and releasing lever is to be pivoted;
- a torsion spring is elastically installed; and
- an engaging piece is formed to be inserted into said rectangular hole.

11. The apparatus for automatically ejecting the magazine in a compact disc player as claimed in claim 1, wherein a guide slot is formed on the rear portion of said magazine housing, and a pair of guide pins are formed on the bottom of said magazine housing, said ejecting lever having a pair of guide slots in which said guide pins are received.

12. The apparatus for automatically ejecting the magazine in a compact disc player as claimed in claim 11, wherein:
- a magazine push piece is formed on the rear end of said ejecting lever to be inserted into and guided to said guide slot of said magazine housing;
- a lock slot is formed on a side thereof to receive a lock piece formed on an end of said main lever; and
- a spring securing piece is formed on an intermediate position of said ejecting lever to connect a tension spring from said lock piece to the front portion of said magazine housing.

13. The apparatus for automatically ejecting the magazine in a compact disc player as claimed in claim 1, wherein a switch is installed on a side of said deck.

* * * * *